A. R. COLGIN.
VARIABLE LIGHTING DEVICE FOR VEHICLES.
APPLICATION FILED OCT. 20, 1915.
1,180,908.
Patented Apr. 25, 1916.
2 SHEETS—SHEET 1.
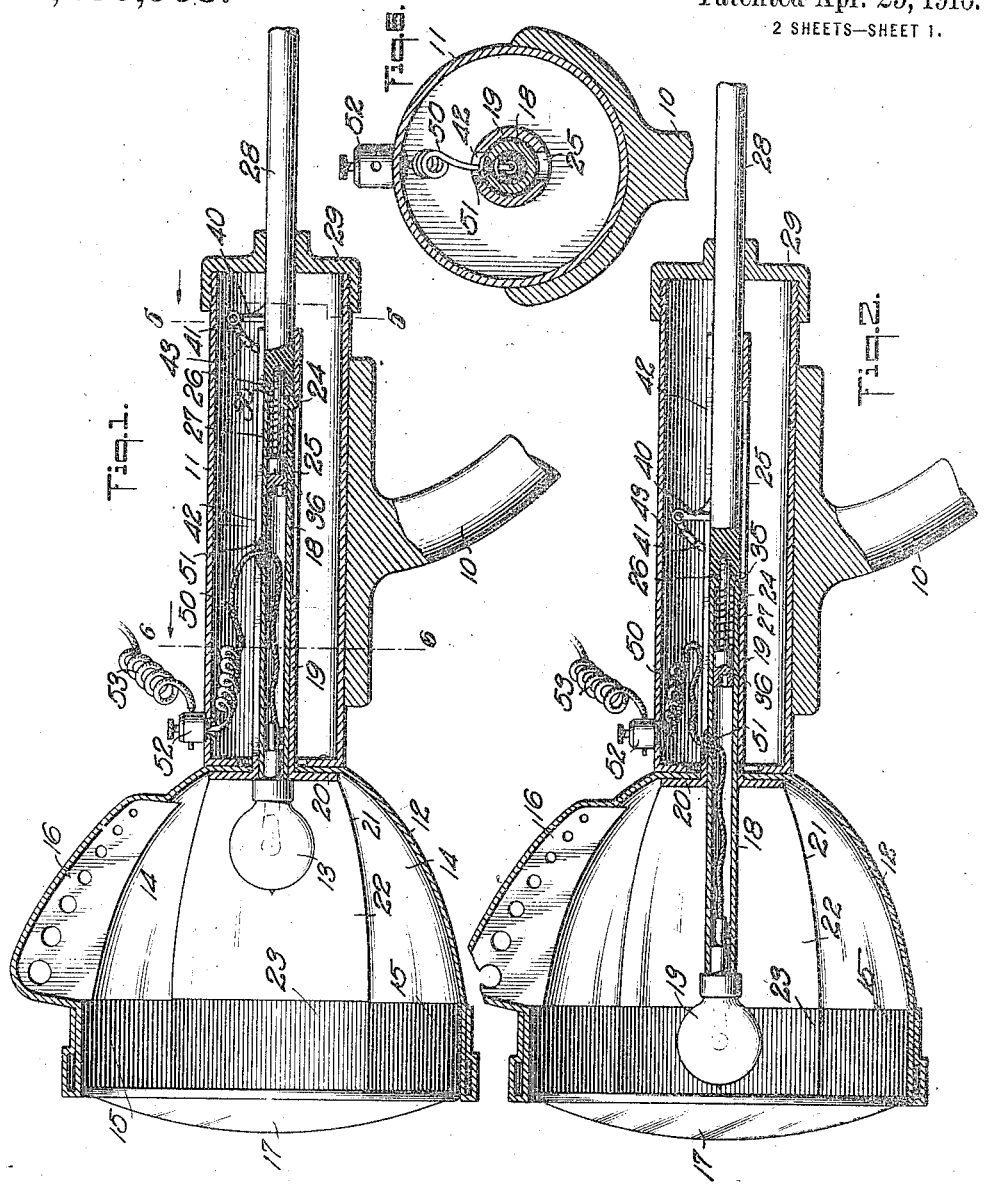
WITNESSES
INVENTOR
Augustus R. Colgin
BY Munn & Co.
ATTORNEYS

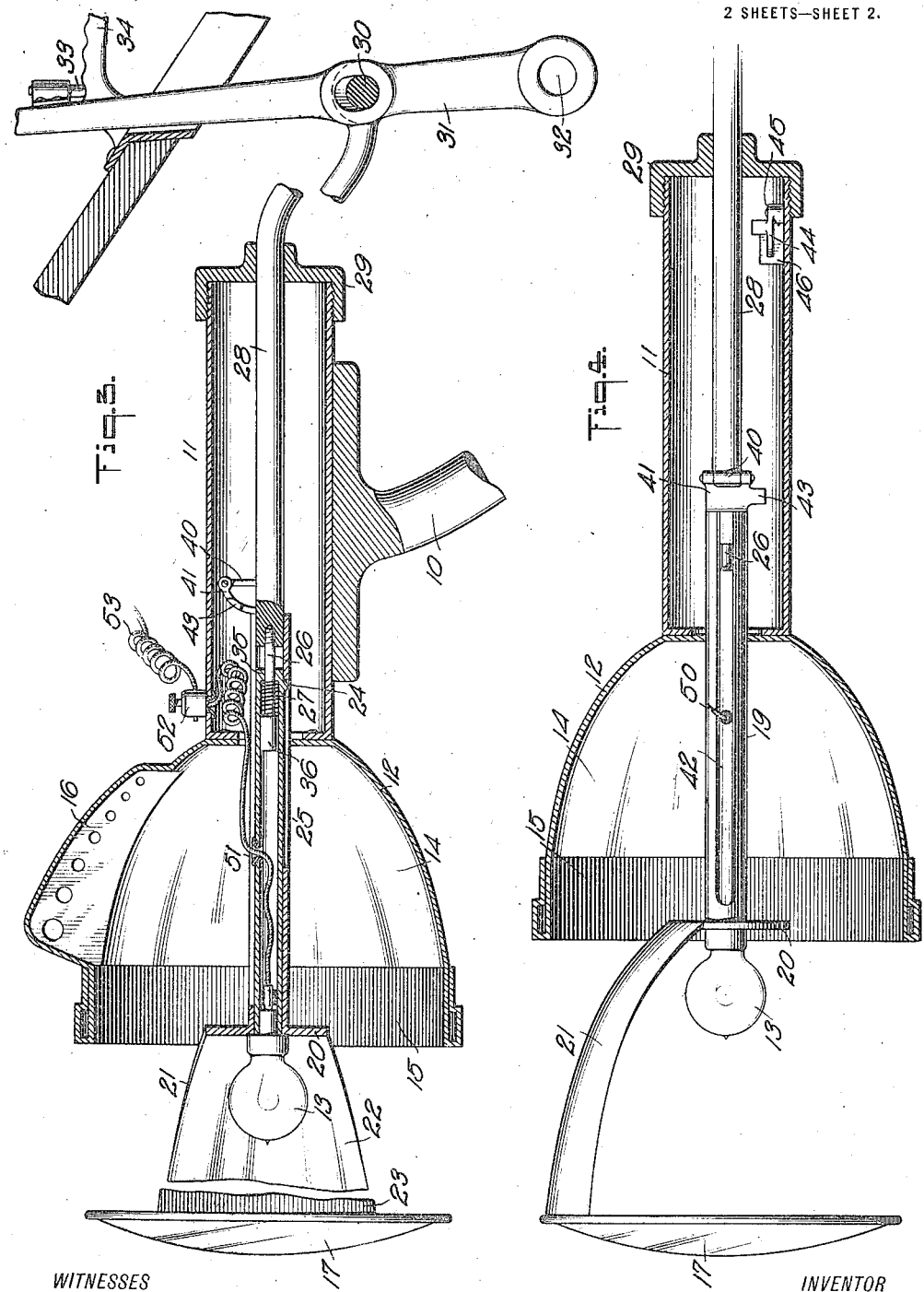

UNITED STATES PATENT OFFICE.

AUGUSTUS R. COLGIN, OF NEW YORK, N. Y.

VARIABLE-LIGHTING DEVICE FOR VEHICLES.

1,180,908.   Specification of Letters Patent.   Patented Apr. 25, 1916.

Application filed October 20, 1915. Serial No. 56,901.

*To all whom it may concern:*

Be it known that I, AUGUSTUS R. COLGIN, a citizen of the United States, and a resident of the city of New York, Richmond Hill, borough of Queens, in the county of Queens and State of New York, have invented a new and Improved Variable-Lighting Device for Vehicles, of which the following is a full, clear, and exact description.

The object of the invention is to provide a new and improved lighting device for automobiles and other vehicles and arranged to permit the driver to use it as a strong headlight, a dimmed headlight or a side light for illuminating signs and other objects at the sides of the roadway.

In order to accomplish the desired result, use is made of a lamp casing, a lamp normally extending within the casing, and manually controlled means for moving the lamp beyond the front end of the casing.

A practical embodiment of the invention is represented in the accompanying drawings forming a part of this specification, in which similar characters of reference indicate corresponding parts in all the views.

Figure 1 is a longitudinal central section of the lighting device with the parts in normal position to provide a strong headlight; Fig. 2 is a similar view of the same with the parts in position for a dimmed headlight; Fig. 3 is a similar view of the same with the parts in position for side lighting purposes; Fig. 4 is a sectional plan view of the same; Fig. 5 is an enlarged cross section of the lighting device on the line 5—5 of Fig. 1; and Fig. 6 is a similar view of the same on the line 6—6 of Fig. 1.

The variable lighting device when used as a headlight for automobiles and other vehicles is mounted in duplicate on the front of the vehicle, and as the two lighting devices are alike in construction it suffices to describe but one in detail. The lighting device is mounted on a bracket 10 attached to the vehicle and on the bracket 10 is fastened a longitudinally extending tubular casing 11 to the front end of which is secured a lamp casing 12 within which normally extends a lamp 13 adapted to be projected beyond the front end of the casing (see Figs. 3 and 4), as heretofore more fully explained. The lamp casing 12 is preferably of parabolic shape with the inner rear portion 14 of its surface rendered reflecting while the forward inner surface portion 15 is rendered dimmed or non-reflective. The top of the casing 12 is provided with a perforate hood 16 for the escape of the heat generated by the burning lamp 13.

The forward end of the casing 12 is normally closed by a cover 17, preferably in the form of a lens, for projecting the rays of light emanating from the lamp 13 and the reflecting surface 14 onto the roadway ahead of the vehicle whenever the lamp 13 is in the position shown in Fig. 1. The lamp 13 is adapted to be moved bodily forward to a position opposite the dimmed portion 15, as shown in Fig. 2, so that only the rays of the lamp 13 pass through the lens 17 to the front of the vehicle to shed a dimmed light onto the roadway, it being understood that when the lamp 13 is in this position it is out of the focus of the reflecting surface 14.

The lamp 13 is attached to the forward end of a tube 18 extending centrally within the casing 11 and mounted to slide in a sleeve 19 terminating at its forward end in a head 20 provided with a forwardly extending arm 21 supporting the cover 17. The arm 21 fits against the inner surface of the lamp casing 12 and connects at its outer end with the peripheral edge of the cover 17, and the inner rear surface 22 of the arm 21 is rendered reflective while the forward inner surface portion 23 is rendered non-reflective and is normally in alinement with the portion 15 of the lamp casing 12, as will be readily understood by reference to Figs. 1 and 2. The sleeve 19 is mounted to slide in the back of the lamp casing 12 and the head 20 of the sleeve normally abuts against the said back, as plainly indicated in Figs. 1 and 2.

The tube 18 is provided with a lug 24 which extends into a slot 25 formed lengthwise in the sleeve 19 to limit the forward and backward sliding movement of the tube 18 within the sleeve 19. The rear closed end of the tube 18 is yieldingly connected by a screw 26 and spring 27 with the forward end of an operating rod 28 extending through the cup 29 held on the rear end of the casing 11. The rear ends of the two rods 28 of the two lighting devices on a vehicle are connected with each other by a crossbar 30 engaged by a hand lever 31 fulcrumed at 32 on the vehicle and under the control of the driver of the vehicle. The hand lever 31 is provided with a locking pin 33 engaging a notched segment 34 for holding the hand lever 31 in whatever position it is moved into by the driver, as hereinafter more fully explained. The screw 26 screws into the forward end of the rod 28 and slidingly engages the rear end of the tube 18 and the spring 27 rests with its rear end on the end 35 and abuts with its forward end against the head 36 of the screw 26. When the parts are in normal position, as shown in Figs. 1 and 2, the spring 27 holds the end 35 of the tube 18 against the forward end of the rod 28 so that when the latter is moved forward a prescribed distance then a similar movement is given to the tube 18 to move the lamp 13 from the bright light position shown in Fig. 1 to the dimmed light position shown in Fig. 2, and when the rod 28 is moved backward then the lamp 13 is returned from the position shown in Fig. 2 to the position shown in Fig. 1.

In order to project the lamp 13 beyond the forward end of the lamp casing 12 and with it the arm 21 and the cover 17 (see Figs. 3 and 4), the following arrangement is made: On the rod 28 within the casing 11 and in the rear of the sleeve 19 is secured a post 40 on which is pivoted a dog 41 normally resting on the top of the sleeve 19 to move forward and backward on the same on moving the rod 28 forward or backward for shifting the lamp 13 from the position shown in Fig. 1, the position shown in Fig. 2 or vice versa, the post 40 traveling during this time through a slot 42 formed in the top of the sleeve 19. When the operator moves the hand lever 31 beyond a normal rearmost position then the dog 41 drops behind the rear edge of the sleeve 19 so that, on the driver imparting a forward movement to the hand lever 31, the tube 18 and the sleeve 19 are caused to travel forward whereby the lamp 13 is projected beyond the front end of the lamp casing 12 and likewise the lens 17, as plainly indicated in Figs. 3 and 4. When the lamp is in this position the rays of light from the lamp 13 are projected sidewise aided by the bright surface 22 of the arm 21 to illuminate the sides of the roadway with a view to permit the driver to read the signs or view other objects at the sides of the roadway, at the same time a portion of the rays of light pass forward through the lens 17 onto the roadway in front of the vehicle. When the sleeve 19 is moved forward by the action of the dog 41, as above explained, the sleeve moves the tube 18 forward by the lug 24 whereby the end 35 of the tube 18 is caused to move away from the forward end of the rod 28 which slightly presses the spring 27, after which the rod 28, the sleeve 19 and the tube 18 move forward in unison with each other. When it is desired to move the lamp 13 and the cover 17 back into normal position, as shown in Fig. 1, then the lever 31 is swung rearwardly by the driver to move the rod 28 rearwardly and with it the sleeve 19 owing to the lug 24 engaging the rear end of the slot 25. When the lever 31 nears rearmost position an arm 43 on the dog 41 engages a cam 44 pivoted at 45 to the casing 11 and resting with its free end on a platform 46 attached to the casing 11. As the arm 43 rides up the cam 44 the dog 41 is pushed out from engagement with the rear edge of the tube 19 to allow the previously compressed spring 27 to push the tube 18 and the sleeve 19 back into rearmost position, as indicated in Fig. 1, with the dog 41 again resting on top of the sleeve 19, as plainly shown in the said Fig. 1.

The lamp 13 is preferably an electric lamp and its conductor 50 extends rearwardly within the tube 18 and passes out of the same by way of an eye 51 to connect with a binding post 52 from which leads a conductor 53 to a suitable source of electric energy. It is understood that the conductor 50 is sufficiently slack to permit forward and backward movement of the lamp 13 as above described without danger of disconnecting the lamp from its source of electrical energy.

From the foregoing it will be seen that by the arrangement described the driver can readily move the lamp 13 from the normal strong headlight position shown in Fig. 1 to the dimmed headlight position shown in Fig. 2, or into the side light position illustrated in Figs. 3 and 4 whenever it is desired to do so.

Having thus described my invention, I claim as new and desire to secure by Letters Patent:

1. A lighting device for automobiles and other vehicles, comprising a casing, a lamp normally within the casing, and manually controlled means mounted to slide in the casing and connected with the lamp for projecting the lamp beyond the front end of the casing.

2. A lighting device for automobiles and other vehicles, comprising a casing, a lens normally closing the front end of the casing, a lamp normally within the casing, and manually controlled means mounted to slide and connected with the lens and lamp for moving the lens forwardly a distance from the casing and projecting the lamp beyond the front open end of the casing.

3. A lighting device for automobiles and other vehicles, comprising a casing, a lens normally closing the front end of the casing, a lamp normally within the casing, a reflector carrying the lens and extending rearwardly at the inner side of the lamp, and manually controlled means mounted to slide within the casing and connected with the reflector and lamp for moving the said lamp, the said reflector and the said lens forward with the lamp extending beyond the forward end of the casing.

4. A lighting device for automobiles and other vehicles, comprising a lamp, a housing for the same and having its interior surface divided into a rear bright reflecting portion and a forward dimming portion, a lens closing the front of the said casing, and manually controlled means for moving the said lamp within the said casing from normal rear position opposite the said bright reflecting portion into forward position opposite the said dimming portion and vice versa.

5. A lighting device for automobiles and other vehicles, comprising a lamp, a housing for the same and having its interior surface divided into a rear bright reflecting portion and a forward dimming portion, a lens closing the front of the said casing, a reflecting and supporting band supporting the said lens and extending along the inner side of the lamp, and manually controlled means connected with the said lamp and the said band to move the lamp forward and backward within the casing and to move the said lens, its supporting band and the lamp into outermost position with the lamp and lens extending beyond the front end of the casing.

6. A lighting device for automobiles and other vehicles, comprising a casing, a lens closing the front thereof, a lamp normally within the said casing and having a stem, a manually controlled rod having a flexible connection with the said stem, a sleeve slidable on the said stem, a reflecting band connecting the said sleeve with the said lens and extending along the inner side of the said lamp, and a dog moving with the said rod and adapted to engage the said sleeve.

7. A lighting device for automobiles and other vehicles, comprising a casing, a lens closing the front thereof, a lamp normally within the said casing and having a stem, a manually controlled rod having a flexible connection with the said stem, a sleeve slidable on the said stem, a reflecting band connecting the said sleeve with the said lens and extending along the inner side of the lamp, a dog moving with the said rod and adapted to engage the said sleeve, and a tripping means for the said dog to disengage the latter from the said sleeve.

8. A lighting device for automobiles and other vehicles, comprising a casing, a lens closing the front thereof, a lamp normally within the said casing and having a stem, a manually controlled rod having a flexible connection with the said stem, a sleeve slidable on the said stem and having a longitudinally extending slot, a lug on the said stem and extending into the said slot, a reflecting band connecting the said sleeve with the said lens and extending along the inner side of the said lamp, and a dog moving with the said rod and adapted to engage the said sleeve.

9. A lighting device for automobiles and other vehicles, comprising a casing having its interior surface divided into a rear reflecting portion and a forward non-reflecting portion, a lamp, the lamp and casing having lengthwise movement one relatively to the other, the lamp in one position being in the focus of the said reflecting portion and the lamp in another position being out of the focus of the said reflecting portion, and means for imparting relative movement to the said lamp and casing.

10. A lighting device for automobiles and other vehicles, comprising a casing, a cover normally closing the front end of the casing, a lamp normally within the casing, and manually controlled means mounted to slide lengthwise of the casing and connected with the cover and the lamp for moving the same beyond the front end of the casing.

In testimony whereof I have signed my name to this specification in the presence of two subscribing witnesses.

AUGUSTUS R. COLGIN.

Witnesses:
   THEO. G. HOSTER,
   GEORGE H. EMSLIE.